No. 735,758. PATENTED AUG. 11, 1903.
H. GRUNHAGEN.
STARCHING MACHINE.
APPLICATION FILED FEB. 1, 1899. RENEWED APR. 27, 1903.
NO MODEL. 3 SHEETS—SHEET 1.
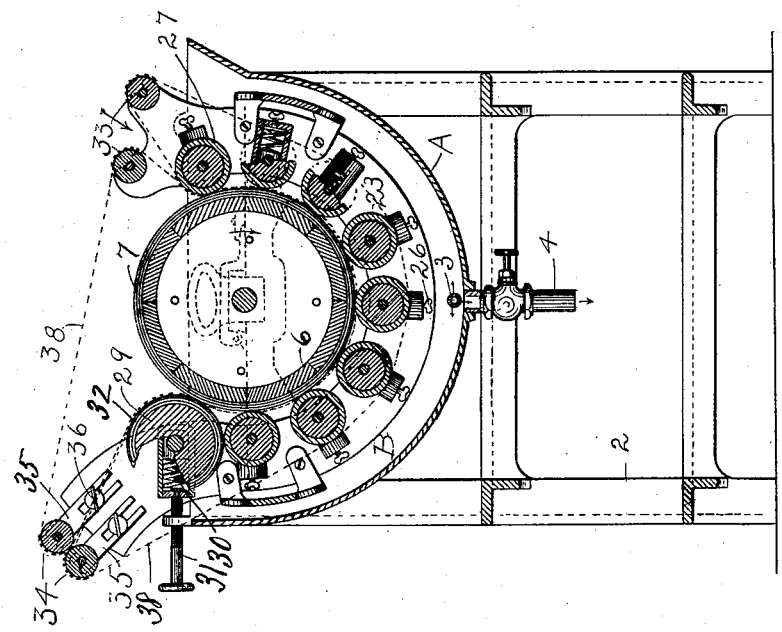
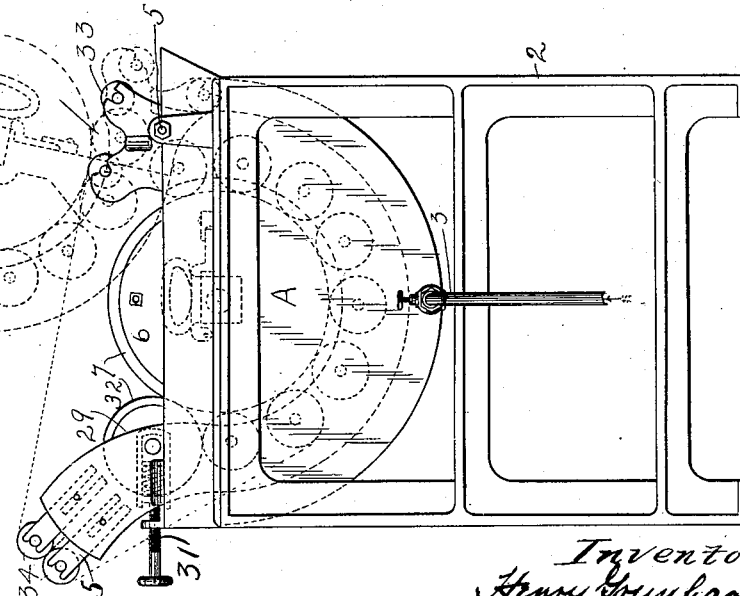
Witnesses
C. F. Kilgore
Elgie H. Evans
Inventor
Henry Grunhagen
By his Attorneys
Merwin Lothrop & Johnson

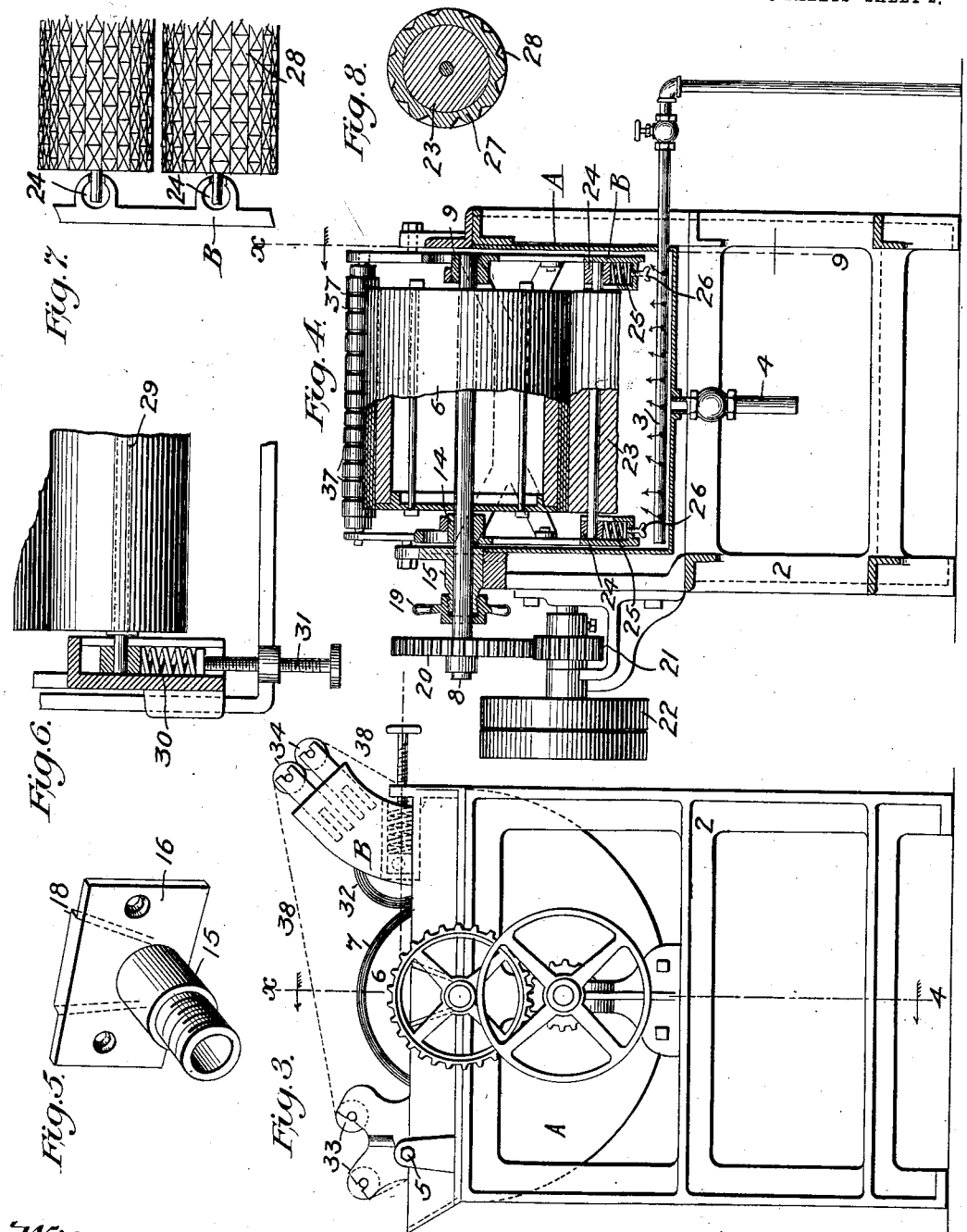

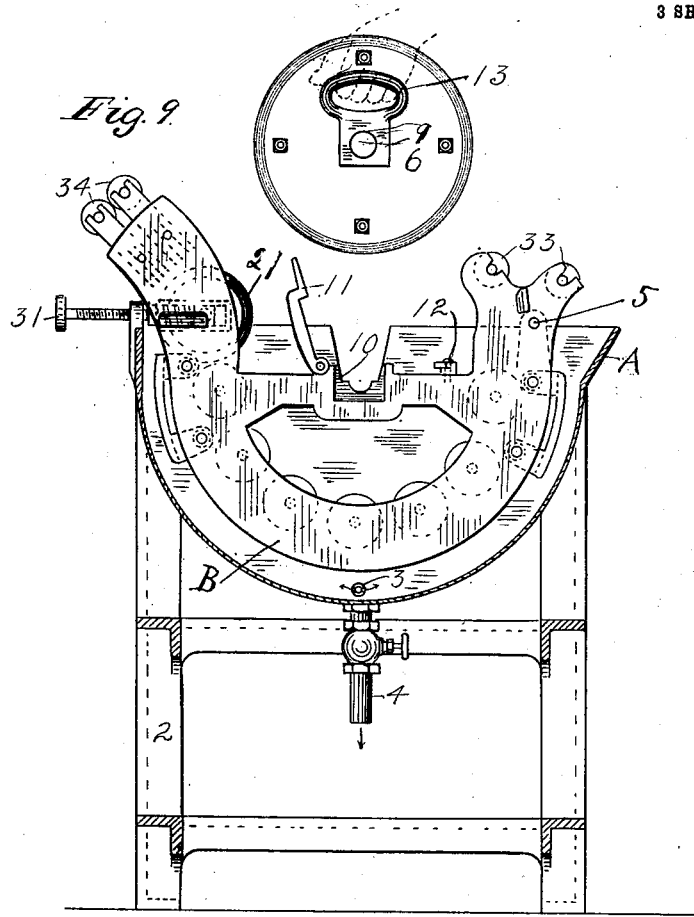

No. 735,758. Patented August 11, 1903.

UNITED STATES PATENT OFFICE.

HENRY GRUNHAGEN, OF ST. PAUL, MINNESOTA.

STARCHING-MACHINE.

SPECIFICATION forming part of Letters Patent No. 735,758, dated August 11, 1903.

Application filed February 1, 1899. Renewed April 27, 1903. Serial No. 154,574. (No model.)

*To all whom it may concern:*

Be it known that I, HENRY GRUNHAGEN, of St. Paul, Ramsey county, Minnesota, have invented certain Improvements in Starching-Machines, of which the following is a specification.

My invention relates to improvements in starching-machines designed particularly for starching collars and cuffs, its object being to provide means for forcing the starch into the collars and cuffs thoroughly and without injury and providing other improved features, hereinafter specifically described and claimed.

In the accompanying drawings, forming part of this specification, Figure 1 is an end view of my improved starching-machine. Fig. 2 is a vertical section through the starch-carrying rollers. Fig. 3 is a side elevation showing the side opposite to that shown in Fig. 1. Fig. 4 is a vertical section on line $x$ 4 of Fig. 3. Fig. 5 is a detail of a bearing-box for the driving-shaft. Fig. 6 is a detail of part of the wiping-roll, showing the tension-bearing therefor. Figs. 7 and 8 are details of the starch-carrying rolls, and Fig. 9 is a section on line $x$ 9 of Fig. 4 with the main starching-roll lifted from the machine.

In the drawings, A represents the starch-receptacle supported in a suitable framework 2. A perforated steam-pipe 3 leads into the receptacle for the purpose of keeping the starch in condition for use, and the receptacle is further provided with an outlet-pipe 4. Within the receptacle is arranged a frame B, having pivotal support 5 at one side of the receptacle.

Having central journal-support in the frame B is the roll 6, covered by cheese-cloth 7. Upon one end of the shaft 8 of said roll is a journal-box 9, which fits into an opening 10 in the side of the frame B and is held therein by a hinged plate 11, said hinged plate being fastened by a pivoted catch 12. The journal-box 9 is provided with a lifting-handle 13. A similar journal-box 14 is arranged upon the opposite end of the shaft and is similarly held in place in an opening in the side of the frame. The end of the shaft adjacent the journal-box 14 passes through a bearing-box 15, said bearing-box being formed with a plate 16, which is secured by thumb-screws to the side of the receptacle and having a projecting part 18, which fits in an opening in the side of the receptacle. A suitable stuffing-cap 19 is screw-threaded upon the end of said bearing-box. A gear 20 is arranged upon the end of the shaft and engages with a gear 21, driven from a suitable source of power through the medium of the pulley 22.

Journaled in the frame B and normally bearing against the roll 6 is a series of starch-carrying rolls 23. The shafts of the starch-carrying rollers are supported in the bearings 24, sliding in recesses in the rim of the frame B, the bearings being removably held together with the shafts of the rollers, and said rollers are held in contact with the main roll 6 by means of springs 25, adapted to be adjusted by set-screws 26. The outer covering 27 of the starch-carrying rolls is of metal and formed with indentations 28 to receive the starch and carry the same to the fabric. By referring to Fig. 2 it will be seen that the bearings of the starch-carrying rolls are held in the recesses of the frame by means of the bed-roll 6 and that upon said roll being removed the starch-carrying rolls can be lifted out of the machine.

Journaled in the rear end of the frame B is a wiping-roll 29, preferably somewhat larger than the starch-carrying rolls. The wiping-roll is held in contact with the bed-roll 6 by springs 30, adapted to be adjusted by set-screws 31, passing through supports secured upon the opposite sides of the machine. The wiping-roll has a covering of cheese-cloth or other suitable fabric 32. Journaled in the forward end of the frame B are the receiving-rolls 33, arranged at some distance apart, as shown in Fig. 2. A pair of similar rolls 34 are carried by the rear end of the frame and arranged in contact, as shown. The discharging-rolls 34 are adjusted toward and from the frame by means of the supports 35, having slot and thumb-screw connection 36 with the frame B. The receiving and discharging rolls 33 and 34 are formed with grooves 37, in which are arranged a series of endless cords 38, which connect the receiving and discharging rolls, as shown, and prevent the cuffs and collars being drawn downward between the starch-carrying rolls. As shown in Fig. 2, two sets of the cords 38 are provided, one set passing over one of the receiving-rolls, thence between the main roll and starch-carrying rolls, around the upper discharge-roll, back to the receiving-roll. The other set passes over the other receiving-roll, thence between the main roll and starch-carrying rolls, around the lower discharge-roll, and back to the receiving-roll.

In use the receptacle of the machine is filled with starch, kept in proper condition by the inlet steam-pipe 3. The articles to be starched are then fed into the machine between the receiving-rolls 33, passing between the bed-roll 6 and the starch-carrying rolls to the wiping-roll 29, where the surplus starch is removed from the articles, and then passed out of the machine between the discharging-rolls 34. The cords connecting the receiving and discharging rolls serve to guide the articles through the machine and prevent them from being drawn downward between the starch-carrying rolls. The indented starch-carrying rolls being metal and the roll 6 having a yielding surface, the starch held by the indentations in the starch-carrying rolls will be thoroughly forced through the articles being starched.

Among the advantages of my machine is the ease with which the machine may be taken apart. By loosening the thumb-screws 31 the frame B, which carries all of the starching-rolls, can be turned upon its pivot out of the starch-receptacle, as shown in Fig. 1. When it is desired to take any of the starch-rolls out, it is only necessary to move the cords out of the way, unscrew the thumb-screws of plate 16, release the hinged plates 11, when the bed-roll 6 can be lifted by its handles from the machine. Any of the starch-carrying rolls can then be removed by lifting their bearings out of the recesses in the pivoted frame B.

I claim—

1. In a starching-machine, the combination with the starch-receptacle, of a main roll journaled therein, a series of starch-carrying rolls journaled adjacent to the periphery of said main roll, receiving-rolls at one end of said series of starch-carrying rolls, discharge-rolls at the opposite end, an adjacent wiping-roll, and guides connecting said receiving and discharge rolls and passing between the main and starch-carrying rolls.

2. In a starching-machine, the combination with the starch-receptacle, of a yielding-surfaced roll journaled therein, a series of metal indented rolls journaled adjacent the periphery of said roll, receiving-rolls at one end of said series of starching-rolls, discharging-rolls at the opposite end, an adjacent wiping-roll and endless guides connecting the receiving and discharge rolls and passing between the main and starch-carrying rolls.

3. In a starching-machine, the combination with the starch-receptacle, of a frame pivotally supported therein, a roll journaled in said frame and having a yielding surface, operating means between said roll and a suitable source of power, a series of metal starch-carrying rolls journaled adjacent the periphery of said roll, and a pair of receiving-rolls, arranged at one end of the series of starch-carrying rolls, a pair of discharging-rolls arranged at the opposite end, a wiping-roll, and a series of cords connecting said receiving and discharging rolls and passing between the main and starch-carrying rolls.

In testimony whereof I have affixed my signature in the presence of two witnesses.

HENRY GRUNHAGEN.

Witnesses:
ANNE F. CAMPBELL,
ARTHUR P. LOTHROP.